United States Patent
Buettner (10) Patent No.: US 11,385,790 B2
(45) Date of Patent: Jul. 12, 2022

(54) TOUCHSCREEN WITH THREE-HANDED GESTURES SYSTEM AND METHOD

(71) Applicant: BBY Solutions, Inc., Richfield, MN (US)

(72) Inventor: Jonathan R. Buettner, Minneapolis, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 17/109,849

(22) Filed: Dec. 2, 2020

(65) Prior Publication Data
US 2021/0089203 A1 Mar. 25, 2021

Related U.S. Application Data

(63) Continuation of application No. 15/371,422, filed on Dec. 7, 2016, now Pat. No. 10,871,896.

(51) Int. Cl.
*G06F 3/04883* (2022.01)
*G06F 3/04886* (2022.01)
*G06V 40/20* (2022.01)
*G06V 40/10* (2022.01)

(52) U.S. Cl.
CPC ...... *G06F 3/04883* (2013.01); *G06F 3/04886* (2013.01); *G06V 40/20* (2022.01); *G06F 2203/04808* (2013.01); *G06V 40/113* (2022.01)

(58) Field of Classification Search
CPC .............. G06F 3/0421; G06F 3/04883; G06F 3/04886; G06F 2203/04808; G06K 9/00335; G06K 9/00389
See application file for complete search history.

(56) References Cited

U.S. PATENT DOCUMENTS

| | | | | |
|---|---|---|---|---|
| 2002/0138444 A1* | 9/2002 | Granfeldt | .............. | G07F 7/1025 705/65 |
| 2010/0134423 A1* | 6/2010 | Brisebois | .............. | G06F 3/0488 345/173 |
| 2011/0157096 A1* | 6/2011 | Drumm | .................. | G06F 3/0421 345/175 |
| 2012/0081317 A1* | 4/2012 | Sirpal | .................. | G06F 3/04847 345/173 |
| 2013/0088434 A1* | 4/2013 | Masuda | ................ | G06F 1/3262 345/173 |
| 2013/0265237 A1* | 10/2013 | MirHosseinZadeh Sarabi ............ G06F 3/04883 345/173 | | |

(Continued)

*Primary Examiner* — Antonio Xavier
(74) *Attorney, Agent, or Firm* — Forsgren Fisher; Daniel A. Tysver; James M. Urzedowski (57) ABSTRACT

A user interface verification device and a method of use is presented for recognizing a three-hand gesture on a touchscreen of the device. The gesture is recognized by detecting a plurality of contact points in at least two, disparate touching zones, and simultaneously detecting additional contact points in a third, disparate touching zone. In one embodiment, the device displays content in a review mode that can be reviewed in a normal manner. In the execution mode, the device requires a signature, a touch, or another sign of acceptance involving a touch within the third touching zone. The device can ensure that a customer directly provides consent by requiring that the two, multi-point touching zones are tactilely engaged by both hands of a presenter while in the execution mode.

12 Claims, 4 Drawing Sheets

(56) References Cited

U.S. PATENT DOCUMENTS

| | | | |
|---|---|---|---|
| 2013/0275907 A1* | 10/2013 | Lau .................... | G06F 3/0488 |
| | | | 715/773 |
| 2014/0047370 A1* | 2/2014 | Moon ................ | G06F 3/04883 |
| | | | 715/770 |
| 2014/0137144 A1* | 5/2014 | Jarvenpaa .......... | H04N 21/6582 |
| | | | 725/13 |
| 2014/0267078 A1* | 9/2014 | Kukulski ............ | G06F 3/03545 |
| | | | 345/173 |
| 2015/0293695 A1* | 10/2015 | Schonleben ......... | G06F 3/0412 |
| | | | 345/173 |
| 2016/0328077 A1* | 11/2016 | DeMena, III ........ | G06F 3/0416 |
| 2017/0038959 A1* | 2/2017 | Walker ................ | G06F 40/103 |
| 2017/0060357 A1* | 3/2017 | Segawa ................ | G06Q 40/02 |
| 2017/0090617 A1* | 3/2017 | Jang ................ | G06F 3/041662 |
| 2017/0139537 A1* | 5/2017 | Maloo ................ | G06K 9/00375 |
| 2019/0191518 A1* | 6/2019 | Guan .................... | H05B 45/18 |

* cited by examiner

TOUCHSCREEN WITH THREE-HANDED GESTURES SYSTEM AND METHOD

RELATED APPLICATIONS

The present application is a continuation of U.S. application Ser. No. 15/371,422, filed on Dec. 7, 2016, which is hereby incorporated by reference in its entirety.

FIELD OF THE INVENTION

The present disclosure is directed to a method and device capable of recognizing a three-handed touchscreen gesture that requires at least two individuals, or at least three "hands," to interact simultaneously with the touchscreen.

SUMMARY

Today's touchscreen devices are able to track and analyze multiple points of contact on a touchscreen, which allows the devices to recognize a great number of complex "gestures." The embodiments described herein relate to a specific touchscreen gesture that ensures simultaneous interaction on the screen by at least three separate hands. Multiple contact points (such as three fingers) are grouped together to represent a single hand. This multiple contact requirement helps to ensure that fingers from a single hand are not used as part of the recognition of two different hands. In another embodiment, a second hand is recognized at a distance from the first, which also serves to prevent fingers from a single hand from being accidentally recognized as being part of two different hands. In yet another embodiment, both the first and second hand are recognized via a three-finger contact.

The third hand can be recognized via a single contact point or via multiple fingers. If a single contact point is used, it is important that this single contact point be remote from the first and second hand locations. In many instances, the single contact point is created through the use of a touchscreen stylus. In other embodiments, the first and second hands are recognized in a static location, and the third hand is recognized by a moving or swiping gesture.

The three-handed gesture is useful in many environments. In commercial environments, for example, a three-handed gesture allows an employee to interact with the device's touchscreen interface on behalf of a customer, but prevents employees from skipping or overriding prompts that the customer is intended to perform.

DETAILED DESCRIPTION

Technical Implementation

Figure 1:
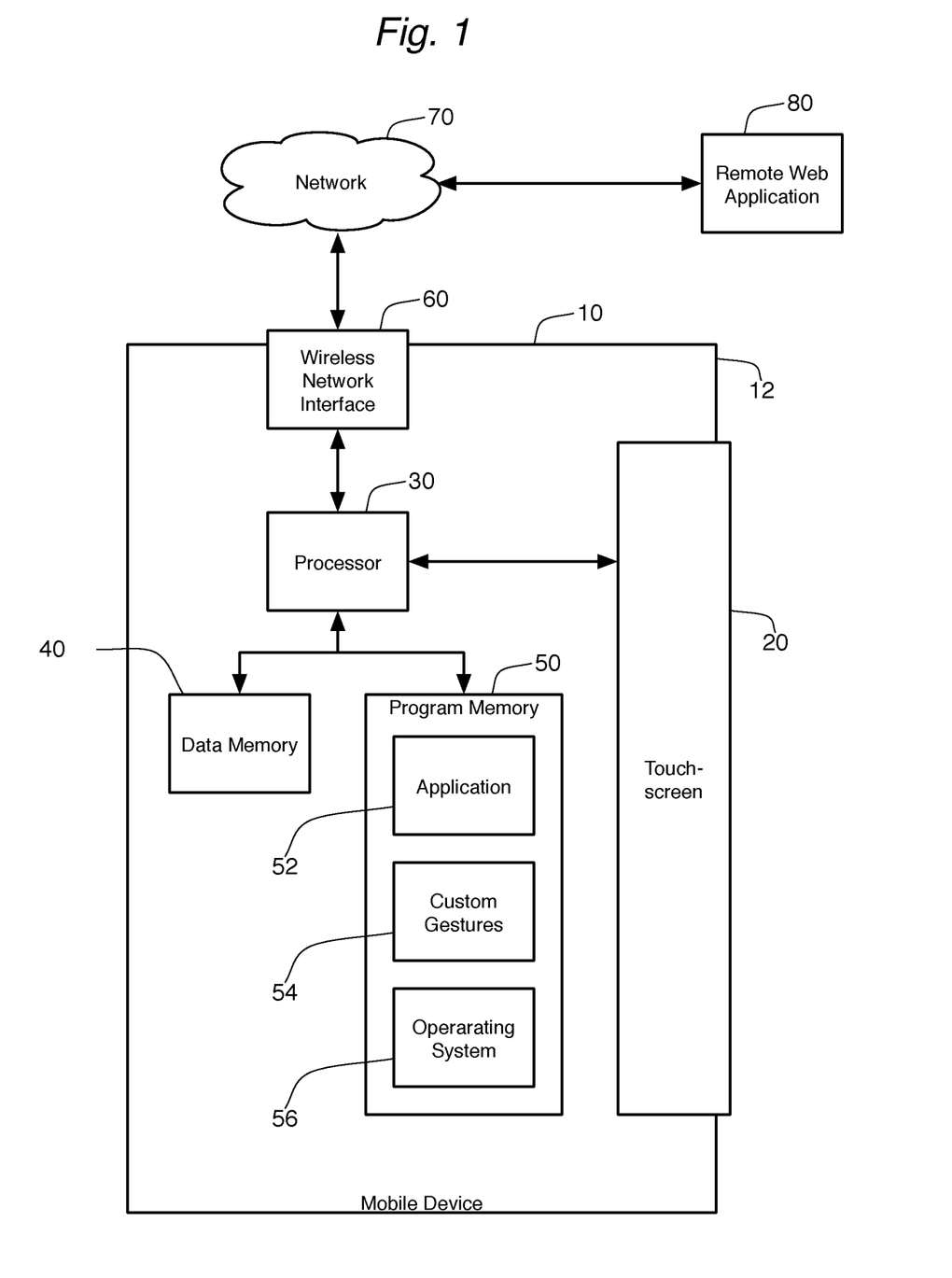
FIG. 1 is a schematic diagram showing the components of one embodiment of the present invention.

A mobile device 10 is shown in FIG. 1. The mobile device 10 may take the form of an electronic tablet, a portable computer, a smart phone, or any other portable electronic communication device that utilizes a touchscreen 20. While the device 10 may be "purpose-built" device created solely for the purpose of implementing the present invention, in most cases the device will be a general purpose mobile device that has been programmed to recognize a three-handed gesture.

As shown in FIG. 1, the device 10 has a housing 12, a touchscreen 20, a processor 30, data memory 40, program memory 50, and a wireless network interface 60 that communicates over a wide area network 70. The processor 30 is responsible for analyzing programming instructions received from program memory 50, for accessing the data memory 40, for communicating over a network 70 via the wireless network interface 60, and for receiving and displaying information through the touchscreen 20. The data memory 40 stores program and system data, while the program memory 50 stores programming code used by the processor 30. Although these two memories 40, 50 are shown separately in FIG. 1, these two types of memory can be implemented using a single logical memory, a single hardware memory structure, or both. These elements 12-60 all work together to allow users to store, process, and display information for the benefit of a user.

In FIG. 1, the program memory 50 is shown containing three types of programs, namely application programming 52, custom gestures programming 54, and operating system programming 56. Application programming 52 defines the applications (or "apps") that are executed on the mobile device 10. The apps 52 can be downloaded from a "store" that distributes apps, or can come pre-loaded onto the mobile device 10 when the device 10 is first purchased.

One such app 52 is a web browser, which allows users to visit web sites and other content over the wireless network interface 60 and the wide area network 70. In FIG. 1, remote web application 80 is shown communicating with the device 10 over the network 70. The remote web application 80 likely takes the form of a web server computer that serves up web-based content over the Internet (network 70). The web browser running on the mobile device 50 can interact with the remote web application 80 to provide a user interface on the touchscreen display 20. In many cases, the remote web application 80 can appear to the user as a local application even though the remote web application 80 is responsible for analyzing inputs and providing content to the mobile device 10. In other words, the web application 80 functions like a local application by presenting the required user interface through the browser application built into the mobile device 10. In other circumstances, the remote web application 80 uses a specially programmed application 52 rather than a standard web browser. This specially programmed application can downloaded through an application store, and will appear to the user to be a self-contained application while actually relying upon the remote web application 80 for the analysis of user content and for providing a user interface on the touchscreen 20.

One benefit of using a custom application 52 is that applications 52 residing on the mobile device 10 can be written to have greater access to the operating system 56 of the device 10 than would be possible through interaction with a web browser. The operating system 56 allows applications 52 residing on the device 50 to access various aspects of the touchscreen 20, to communicate over the wireless network interface 60, to store and retrieve data in the data memory 40, and to communicate with other input/output and sensor elements such as a microphone, a speaker, an accelerometer, a GPS circuit, etc. (none of which are shown on FIG. 1). In contrast to local applications 52, remote applications 80 operating through a standard web browser are not given complete access to these functions.

In the preferred embodiment, the operating system 56 identifies particular inputs on the touchscreen and interprets these inputs as one or more "gestures." Typical gestures include a swipe gesture, a pinch gesture, a zoom gesture, a rotate gesture, and a two-finger swipe gesture, among others. The application programming 52 does not need to independently identify when a user is performing a particular gesture (such as the pinch gesture). Instead, the application 52 uses the application programming interface (or "API") provided by the operating system 52 to identify the gesture.

The three-handed gesture implemented by the embodiments described herein is not handled by standard, preprogrammed APIs for known mobile device operating systems. Instead, the technology required to detect this unique gesture is stored in the program memory 50 as custom gesture programming 54. This programming 54 can take the form of a library or other programming construct that can be used and shared by multiple application programs 52. This custom gesture programming 54 relies upon the facilities provided by the operating system 56, and provides a common interface for different applications 52 to access this programming 54. In other embodiments, the three-handed gesture recognition programming 54 can be integrated directly into the application programming 52 that requires this capability, or can be included as a standard part of the capabilities of the operating system 56.

Regardless of whether this programming 54 is embedded with an app 52, embedded in the operating system 56, or remains separate from each of these, the purpose of the custom recognition programming 54 is to recognize a three-handed gesture. The three-handed gesture requires that three different "hands" engage or touch the touchscreen 20 simultaneously. In describing these three engagements as being "simultaneous," it is meant that the engagements are detected concurrently, not that all three engagements are initiated at precisely the same moment. This type of three-handed gesture has a variety of practical uses, only some of which are described herein. This gesture can be used, for instance, to require interaction of at least two different users in order to gain access to certain functionalities of the device 10 or to record consent to an agreement.

Figure 2:
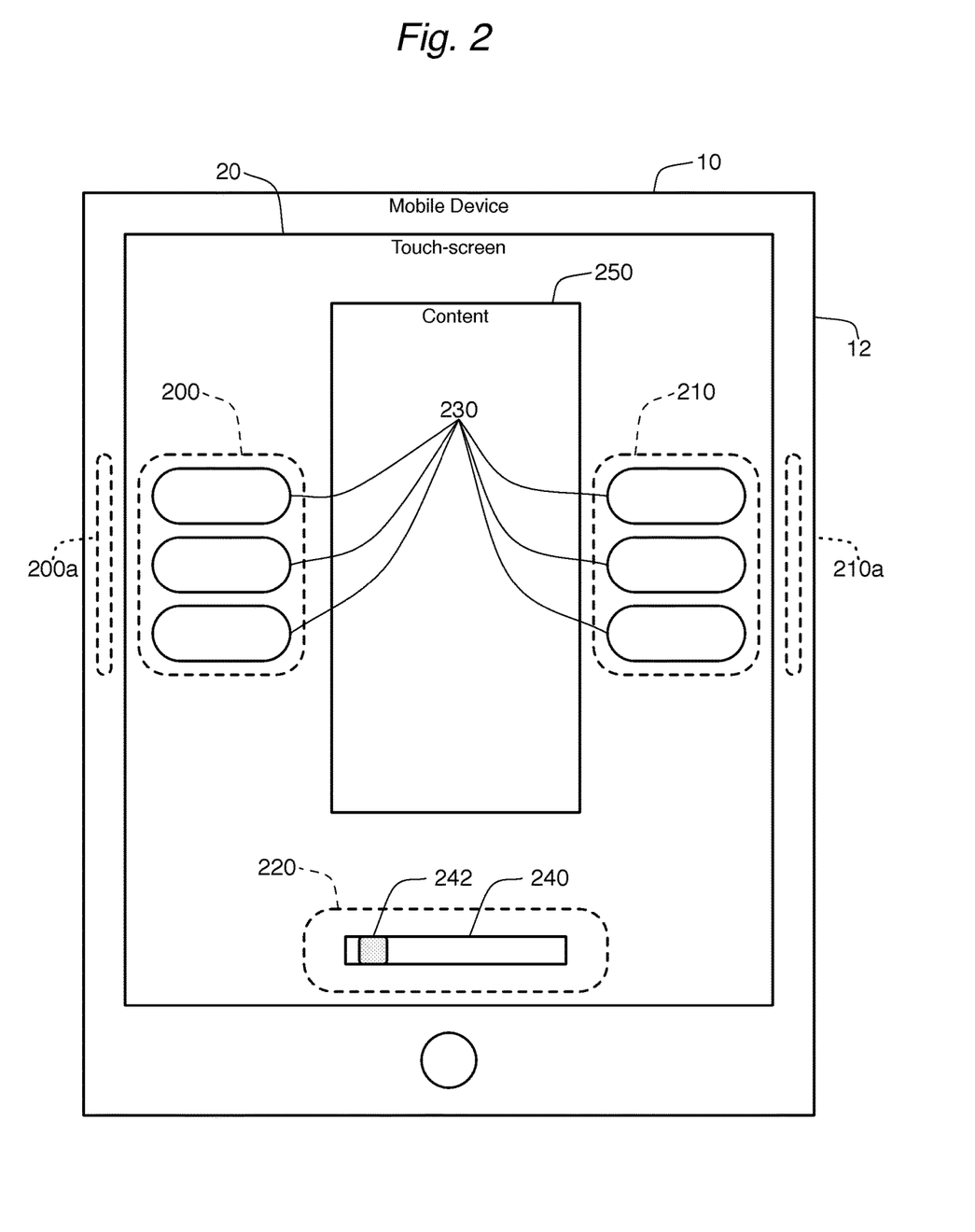
FIG. 2 is front view of an embodiment of the present invention showing a potential configuration of use.

FIG. 2 shows one sensing configuration that can be used to verify a three-handed gesture. In this Figure, the mobile device 10 receives input through its touchscreen 20 in three different touch zones 200, 210, and 220. These zones 200, 210, 220 are preferably divided by sufficient physical space on the touch screen 20 so as to prevent one or two hands from simultaneously touching all three zones 200, 210, 220. While this disclosure discusses the desirability of "preventing" this situation, it is sufficient for the configuration to render the occurrence difficult or unnatural for the user. In addition, it is important that these zones be non-overlapping so that a single touch is not registered in two zones. In FIG. 2, the touchscreen 20 is vertical, with one zone 200 on the left of the screen 20, one zone 210 on the right, and one zone 220 on the bottom. None of these zones overlap, and all are located far from each other on the touchscreen 20. In one embodiment, if all three zones 200, 210, and 220 are simultaneously touched, the three-handed gesture is recognized.

On a standard-sized touchscreen 20 it would be possible to touch all three zones 200, 210, and 220 with one or two hands. In one configuration, therefore, two of the zones 200, 210 are not recognized as properly touched unless multiple touch points (described herein as fingers) are identified in zones 200, 210. In FIG. 2, both the left zone 200 and right zone 210 are shown on the touchscreen 20 with three finger location markers 230. These finger location markers 230 serve as guides to a user. In order to register a full "touch" of the left 200 or right zone 210, a separate contact point must be registered in each of these finger location markers 230. In practice, this may be best accomplished by gripping the mobile device 10 from behind while placing one finger in each of the location markers 230. When gripped in this matter, it is impossible (or at least very difficult) for the user grasping the device to also input a touch in the third touch zone 220, thereby requiring a third hand in order for a touch to be registered in all three zones 200, 210, 220.

In FIG. 2, a slide bar 240 is shown in the bottom touch zone 220. To register a touch in this zone 220, the user must touch the slide marker or button 242 and slide the button 242 to the right in the slide bar 240. If this is accomplished while contact is being registered at all the finger location markers 230, the three-handed gesture is recognized.

The exact location of the three zones 200, 210, and 220 can be predetermined before any contact with the touchscreen. In such cases, the touchscreen 20 can present a visual indication of the location of these zones. In FIG. 2, zones 200, 210, 220 are shown in dotted lines to indicated that these zones are not actually shown on the touch screen display 20. In contrast, the finger location markers 230 and the slide bar 240 are visually displayed on the screen 20 in order for the users to successfully execute the three-handed gesture. In other embodiments, the left and right zones 200, 210 could be actually displayed on the screen 20 and the finger location markers 230 could be removed from the display. In these embodiments, all that would be necessary is to recognize the touch of at least three fingers inside the left and right zones 200, 210. In still other embodiments, the finger location markers 230 could be shown on the display, but it would not be necessary that each recognized finger touch occur within the rigid confines of the displayed finger location markers 230. As long as three separate finger touches are recognized anywhere within each of the left and right zones 200, 210, the gesture would be recognized. Of course, not all embodiments will require three points of contact in each of the left and right zones 200, 210. Any number from one to five may be possible, although one is not preferred because it would be easy for a user to touch multiple zones 200, 210, 220 simultaneously and a requirement of five fingers within two or more zones 200, 210, 220 would make it difficult for any party to view any content 250 that may also be displayed on the screen 20. Furthermore, the slide bar 240 shown in touch zone 220 is merely exemplary of a user interface element that requires user interaction with the screen 20 in that zone 220. The zone 220, for example, might require only the pressing of a button (a single finger being recognized), or the touching of multiple fingers simultaneously (much like as described above for zones 200, 210).

As shown in FIG. 2, touchscreen 20 has a four-sided, rectangular shape, and touch zones 200, 210 are located proximal to opposing sides of the touchscreen 20. While these zones 200 need not be directly opposing each one another (i.e., they do not need to be equidistant from a third side), it is frequently preferred that these touch zones 200, 210 be adjacent to opposite sides of the touchscreen 20. These locations would make it possible to hold the device from behind in an outstretched manner. In other words, one user could hold the device 10 from behind while keeping three fingers in zones 200, 210, and then present the device 10 to a second user so that they could register their touch in zone 220. Note that in FIG. 2, touch zone 220 is located proximal to a third side of the touchscreen. In some embodiments, it is possible to create a dedicated mobile device that implements the first and second touch zones within the housing 12 of the mobile device outside of the touchscreen itself 20. This would require implementing dedicated touch sensors within the housing that would replace the zones 200, 210 that are implemented through the touchscreen. In FIG. 2, locations 200a and 210a show possible locations for these dedicated, alternative touch sensors immediately adjacent to the main touchscreen 20 of the device 10. In some embodiments, these alternate locations 200a, 210a can be positioned along the top, bottom, or sides, of the device housing 12.

In another embodiment, the three zones 200, 210, and 220 are not pre-defined to particular locations on the touchscreen 20. In these cases, the gesture recognition programming 54 looks for an adequate number of separate contact points within two different areas that exist on opposite sides of the screen 20. For example, the programming 54 could look for two clusters of at least three contact points. If the points within each clusters are sufficiently close to each other to fall within a touch zone, and the two clusters are sufficiently far from each other (such as on opposite sides of the touchscreen 20), the programming 54 will recognize these as two hands in a three-handed gesture. The programming may then display on the screen some indicator of a third zone, such as slide bar 240, that is located on the screen relatively remote from the two already-identified touch zones. When an appropriate touch is received in this third zone, the three-handed gesture is recognized.

First Method

Figure 3:
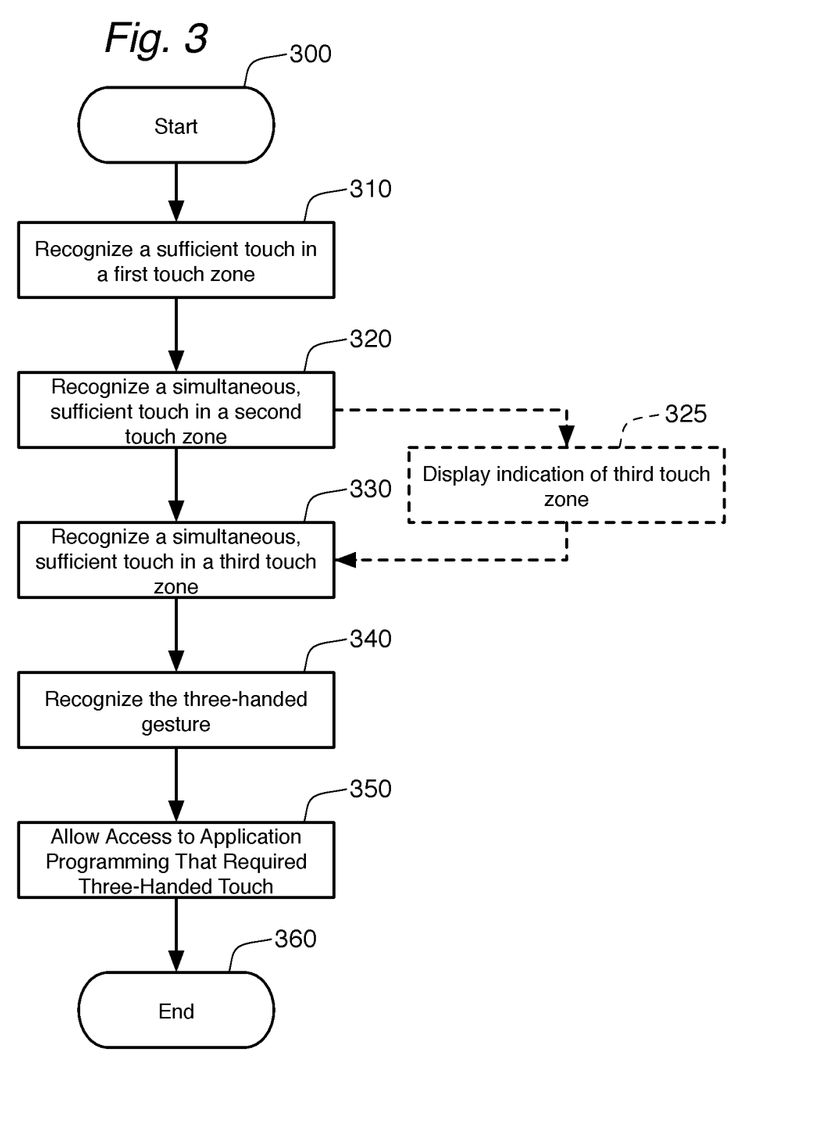
FIG. 3 is a flow chart showing a method for implementing an embodiment of the present invention.

A method 300 for recognizing a three-handed gesture on a touchscreen 20 is shown in FIG. 300. The method starts in step 310, where a sufficient touch in a first touch zone (such as zone 200) is recognized. In the preferred embodiment, the recognition of a touch involves the use of APIs in the operating system 56 that allow for applications 52 and custom libraries and the like (such as customer gesture programming 54) to request identification of gestures and touches on the tablet device 10. As explained above, the touch zone for step 310 can be a pre-defined area on the touchscreen 20. In these circumstances, the touch zone (or elements within the touch zone), can be displayed on the screen 20 itself. For a touch to be sufficient, it may be necessary for the gesture programming 54 to identify multiple touches in the touch zone, such as the three separate touches described above in connection with FIG. 2. Other requirements for a sufficient touch could be defined, as is also described above. If the first touch is recognized in step 310, the method moves on to steps 320 and 330 to recognize touches in a second and third touch zone, respectively. The physical separation of the three touch zones, along with the requirements that the touch be "sufficient" in each zone before it is recognized, helps to ensure that three separate hands are being used. Again, each of these zones may require multiple touches, or a sliding interaction, or any other type of known sub-gesture within the zone. Once this is accomplished, the three-handed gesture is recognized in step 340. In one embodiment, the three-handed gesture must be recognized in step 340 before additional programming or content is made available to the user. The content can be under control of either local application programming 52 or remote application programming 80, although in either case the preferred embodiment requires the gesture recognition programming 54 to be located local to the mobile device 10 to allow full access to the operating system 56. Thus, in step 350 of the method 300, access is granted to this additional application programming or content after the recognition of the gesture in step 340. In other embodiments, the three-handed gesture can be used to indicate a user's consent to an agreement, notice, purchase order, or the like. In these embodiments, step 350 would record the fact that consent/assent was given via the three-handed gesture. The method ends at step 360.

In embodiments where the touch zones are not predefined, steps 310 and 320 will examine the entire touchscreen 20 to look for sufficient touches. Once found, as described above, optional step 325 may then display on the touchscreen an indication of the third touch zone. Note that optional step 325 can also be used in cases where touch zones are predefined. In this case, the third zone is not visually displayed on the touchscreen until after the first two zones have received recognized touches (steps 310 and 320). In either case, the method would then continue after optional step 325 at step 330.

Commercial Applications

One application of this new gesture recognition technology exists in a commercial setting. In these settings, employees and customer both routinely interact with systems, remote applications, and databases through a mobile device having a touchscreen. In these environments, tablet computers are frequently used to display various forms, including privacy disclosures, terms of use, contracts, orders, and discount offers on potentially desired products and services. These forms may be displayed on a touchscreen 20, be filled out, or otherwise modified by interacting with the touchscreen 20, and finally be agreed to by one or both of the customer and the commercial establishment's representative. The three-handed gesture allows employees to guide a customer through material on the tablet computer while preventing those employees form skipping over or overriding prompts or other actions that the customer is intended to perform. The three-handed gesture can be implemented as a requirement of user consent, whereby an employee must contact the touchscreen on two sides with two or more fingers of each hand, such as would be indicative of holding the device outward toward a customer for his or her inspection and use. Only when properly held in this manner will the device allow further interaction with the touchscreen by the customer (the third "hand") to indicate their consent. In this manner, it is the customer who actively views and consents to the content on the screen while the presenter acts as a passive observer who cannot actively engage the consent portion of the interface screen 20.

As explained above, the device 10 of the present invention is uniquely configured so as to require three "hands" to engage the touchscreen 20 in order to interact with certain functionalities of the device 10, such as the appearance of a signature or execution screen/box, various product or service offers, personal information input screens, etc. In describing user interaction with the device 10 as requiring "three hands," what is meant is that a nominal user of the device 10, such as a store employee or sales associate (hereinafter referred to as a presenter), must hold the device with two hands and present the touchscreen interface 12 toward a third party individual (hereinafter a customer), so that the customer is capable of interacting with the interface 12 via their hand, a stylus or other mechanism of personal interaction (i.e. the aforementioned third hand).

To ensure that appropriate device functionality is available to only the customer, the device 10 includes two contact or touch zones 200, 210, each of which must be brought into contact with multiple fingers of each hand of the presenter. Only when each contact zone 200 and 210 is engaged by the fingers of the presenter is the device 10 activated to receive input in the third touch zone 220. This activation is shown visually by displaying the means for receiving the input, such as the slide bar 240 shown in FIG. 2. In the context of method 300, it is optional step 325 that displays this ability to receive input in the third touch zone 220. In one embodiment, the third zone 220 is capable of receiving input only as long as the first two zones have a registered touch. If the user holding the device 10 were to stop their engagement with zones 200 and 210, the slide bar 240 would disappear and input would not be received in the third zone 220.

Figure 4:
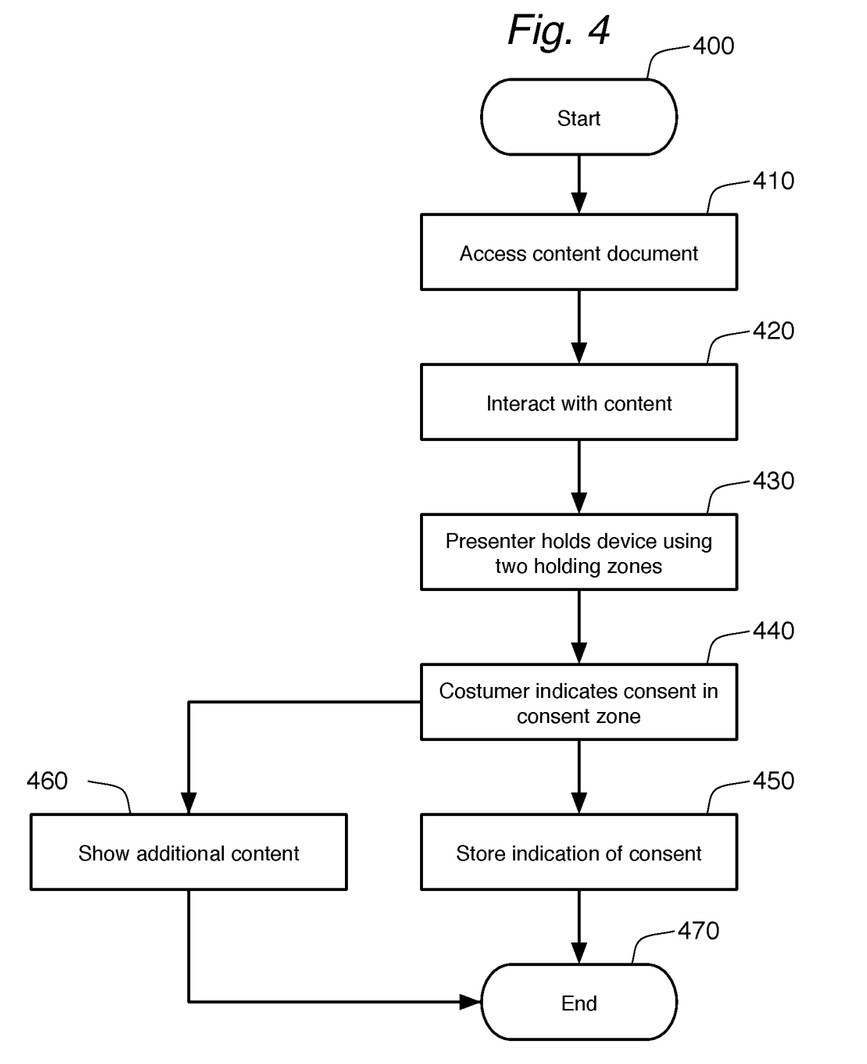
FIG. 4 is a flow chart showing a method of using the present invention.

A method of using the three-handed gesture in a commercial environment is presented in FIG. 4. In this method, a user may use the touchscreen 20 to accesses content from the memory 40 of the device 10 or to access a portion of a local application 52 or the remote web application 80. This occurs in step 410 of method 400. This content may be presented in the form of any of a variety of audio and/or visual mediums. A typical form of such content 250 may be an electronic document. As used herein the term "document" may be an electronic document comprised of text as is traditionally understood. A document may also comprise audio, video, still images and even tactile elements presented through the touchscreen interface 20. Upon being displayed on the touchscreen 20, both the presenter and user are allowed to freely review and interact with the document 250 displayed (step 420). During this phase of document review, there is no requirement for the presenter to have tactile contact with the touch zones 200. 210. During this review, the interface 12 may be engaged so as to allow screen scrolling and other common functionalities associated with document review. For example, a presenter may be progressing through an order screen with a customer, presenting options displayed on the screen 20 to the customer, and even inputting order options on behalf of the customer.

After the customer or presenter has progressed sufficiently far through the content 250, it may be necessary or desirable for the customer to provide authorization or agreement to terms stated in the document. The terms might be contractual terms requiring assent by a customer, or an agreement to an appointment such as a delivery date, or a notification of terms such as a HIPPA agreement or a privacy policy. In each case, it is important to ensure that it is the customer that indicates assent or agreement, and not the presenter/employee. In one embodiment where the three-handed gesture is used to require a customer's consent, one of the zones could be considered the "consent" zone, meaning that this is the zone that is used by the customer to indicate their consent, assent, agreement, or acknowledgement of the content 250. In FIG. 2, the consent zone might be zone 220, while zones 200, 210 are the "holding" zones in which a presenter or employee holds the mobile device 10 while the customer provides their consent. The presenter then holds onto the mobile device 10 touching the two holding zones 200, 210 (step 430). In step 440, the customer provides their consent/agreement by touching the consent zone 220. The three-handed gesture is successfully recognized, as described above, and the consent of the customer is accepted.

In the embodiment of FIG. 2, the consent zone is located in the lower touch zone 220. There is no requirement, of course, for the consent zone to be located at the bottom of the touchscreen 20, as any location could be appropriate. Furthermore, in FIG. 2 the indication of assent is shown as a slide bar 240. Of course, other interface elements can be used to show agreement, such as a "push" button or a signature box. If a signature box is used, it is possible that the touch being registered in the consent zone is being provided by a stylus. The agreement indicator could also be in the form of a trace path, in which the customer must follow some pre-defined path to indicate consent. In other words, the indication of assent may be the detection of one or more static touch points in the consent zone, or the detection of a moving contact point within that zone. In one embodiment, the device 10 is configured to prevent the display of any mechanism for consent (such as an appropriate signature space or slide bar) on the touchscreen 20 until two of the three touch zones have been successfully touched (such as zones 200 and 210). When the presenter is properly touching both holding zones, the processor 30 receives a signal, and the application 52 will then present the information in the consent zone that allows the receipt of consent (see step 325 of FIG. 3).

In another embodiment, the application 52 operates in two modes, a document review mode and a document execution mode. In the document review mode, the presenter and the customer can review the content 250 presented on the display 20 freely (as in step 420 above). In this mode, however, the customer may not consent/agreement to/acknowledge this content 250, as such consent may only occur in document execution mode. One method of transitioning into the document execution mode is for the presenter to grasp the holding zones of the tablet 10 (step 430). This tactile contact of these zones (such as zones 200, 210 in FIG. 2) notifies the application 52 and processor 30 that touchscreen 20 should now be transitioned from the document review mode to the document execution mode. In the document execution mode, the touchscreen 20 displays a signature block, customer authorization acceptance box or other electronic mechanism of receiving and recording customer assent or acknowledgment in the consent zone (such as zone 220). As long as tactile contact is maintained at both holding zones (such as zones 200, 210), the consent zone is displayed on the touchscreen 20 and may be interacted with by tactile input by the customer's finger, hand, stylus or other implement suitable for use with inputting data (step 440). In the event that either or both of the contact holding zones detect loss of proper contact, the application 52 will revert the touchscreen display 20 back to the document review mode (step 420), and remove the ability for the content 250 to be executed or acknowledged.

Following the receipt of consent from the customer, the application 52 will save an indication of this consent in the data memory 40 or transmits this consent to the remote web application 80 (step 450). Once the content 250 is appropriately acknowledged, at any point thereafter the presenter may disengage the holding zones (such as 200, 210) to allow the device 10 to revert to the document review mode, whereupon new content for the same or a different customer may be accessed and displayed on the touchscreen 20.

In another embodiment, the device 10 may be configured such that, upon successfully recognizing the three-handed gesture as an indication of consent, an application 52 automatically accesses and displays on the touchscreen 20 additional content. This is shown as step 460 in FIG. 4. This content may comprise, for example, special discount offers, an opportunity to enroll in a loyalty program, a specialty credit card, or a coupon. In some cases, the customer needs to only review this content and does not need to indicate any additional consent. In these cases, the device 10 reverts to document review mode. In other cases, this additional content may require additional consent, such as an offer to receive additional services along with a purchase of goods. As long as the presenter maintains contact with the holding zones, the device 10 remains in document execution mode and the customer may review and accept/consent to the additional content by signing or agreeing in one of the manners described above. The method ends at step 470.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method of using a device having a touchscreen to ensure input from two parties for the purpose of assuring proper consent to a document comprising:
   a) on the device, displaying the document on the touchscreen;
   b) on the device, detecting a plurality of points of contact on the touchscreen at each of two different touch zones located distant from each other on the touchscreen to verify the device is being properly held, wherein neither touch zone is pre-defined to any particular location on the touchscreen but is identified after detecting and analyzing the plurality of points of contact;
   c) on the device, after detecting the plurality of points of contact at the two different touch zones, displaying a mechanism for receiving consent at a third touch zone;
   d) on the device, only while still detecting the plurality of points of contact at the two different touch zones, recognizing consent by detecting an input of consent at the third touch zone; and
   e) recording the consent in a data memory.

2. The method of claim 1, wherein the two different touch zones are located proximal to opposites sides of the touchscreen.

3. The method of claim 2, wherein the third touch zone is located proximal to a third side of the touchscreen that differs from the sides proximal to the two different touch zones.

4. The method of claim 1, wherein the step of detecting the input of consent at the third touch zone comprises recognizing a plurality of simultaneous points of contact in the third touch zone.

5. The method of claim 1, wherein the step of detecting the input of consent at the third touch zone comprises recognizing a moving point of contact.

6. The method of claim 5, wherein the displayed mechanism for receiving consent at the third touch zone comprises a slide bar interface.

7. The method of claim 1, wherein the step of detecting a plurality of points of contact on the touchscreen at each of the two different touch zones further comprises detecting a cluster of three separate points of contact for each of the two different touch zones.

8. The method of claim 7, wherein each cluster is detected when the three separate points of contact are determined to be sufficiently close to each other, further wherein the two clusters are sufficiently far from each other to form separate touch zones.

9. A method of detecting a three-handed gesture on a touchscreen comprising:
   a) detecting proper contact at two different touch zones located on the touchscreen, wherein neither of the two different touch zones is pre-defined to any particular location on the touchscreen but is identified after detecting and analyzing the touchscreen contact, wherein proper contact at the two different touch zones is identified by:
      i) detecting a first cluster of three points of contact on the touchscreen that are proximal to each other to form a first touch zone,
      ii) detecting a second cluster of three point of contact on the touch screen that are proximal to each other to form a second touch zone, and
      iii) confirming that the first touch zone is sufficiently far from the second touch zone;
   b) after detecting proper contact at the two different touch zones, displaying an input mechanism at a third touch zone that is separated on the touchscreen from the first and second touch zones; and
   c) on the device, only while still detecting the proper contact at the two different touch zones and while displaying the input mechanism, recognizing contact on the touchscreen at the input mechanism.

10. The method of claim 9, wherein the step of recognizing contact at the input mechanism comprises recognizing a plurality of simultaneous points of contact.

11. The method of claim 9, wherein the step of recognizing contact at the input mechanism comprises recognizing a moving point of contact.

12. The method of claim 11, further the input mechanism comprises a slide bar interface.

\* \* \* \* \*